US012741872B2

(12) United States Patent
Gopalan et al.

(10) Patent No.: US 12,741,872 B2
(45) Date of Patent: Sep. 22, 2026

(54) SELF-ASSEMBLING ROD-COIL COPOLYMERS FOR CARBON NANOTUBE SORTING AND THE FABRICATION OF CARBON NANOTUBE FILMS

(71) Applicant: Wisconsin Alumni Research Foundation, Madison, WI (US)

(72) Inventors: Padma Gopalan, Madison, WI (US); Michael Scott Arnold, Middleton, WI (US); Stephanie Oliveras Santos, Madison, WI (US); Songying Li, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 850 days.

(21) Appl. No.: 18/152,900

(22) Filed: Jan. 11, 2023

(65) Prior Publication Data

US 2024/0228294 A1 Jul. 11, 2024

(51) Int. Cl.

| | |
|---|---|
| ***C01B 32/172*** | (2017.01) |
| ***C01B 32/159*** | (2017.01) |
| ***C01B 32/174*** | (2017.01) |
| ***C08K 3/04*** | (2006.01) |
| ***C08L 47/00*** | (2006.01) |

(52) U.S. Cl.

CPC .......... *C01B 32/172* (2017.08); *C01B 32/159* (2017.08); *C01B 32/174* (2017.08); *C08K 3/041* (2017.05); *C08L 47/00* (2013.01); *C01B 2202/02* (2013.01)

(58) Field of Classification Search

CPC ... C01B 32/172; C01B 32/159; C01B 32/174; C01B 2202/02; C08K 3/041; C08L 47/00

See application file for complete search history.

(56) References Cited

U.S. PATENT DOCUMENTS

| | | | | |
|---|---|---|---|---|
| 7,264,876 | B2 | 9/2007 | Smalley et al. | |
| 8,211,969 | B2 | 7/2012 | Zou et al. | |
| 9,505,615 | B2 | 11/2016 | Misra et al. | |
| 2009/0140237 | A1 | 6/2009 | Wu et al. | |
| 2017/0141319 | A1 | 5/2017 | Noh | |
| 2021/0005894 | A1* | 1/2021 | Murase | H01B 1/24 |

OTHER PUBLICATIONS

Chang, H.-C. et al., "Conjugated fluorene-moiety-containing pendant polymers for the dispersion of single-wall carbon nanotubes: polymer wrapping abilities and electrical properties," Polymer Journal, 2016, pp. 421-429, vol. 48, No. 4.

International Search Report and Written Opinion in International Patent Application No. PCT/US2023/078309 dated May 2, 2024, 10 pages.

Ribeiro, Anielen H., et al. "Direct synthesis of light-emitting triblock copolymers from RAFT polymerization." Polymer Chemistry 12.2 (2021): 216-225.

Fujigaya, Tsuyohiko, and Naotoshi Nakashima. "Non-covalent polymer wrapping of carbon nanotubes and the role of wrapped polymers as functional dispersants." Science and technology of advanced materials 16.2 (2015): 024802.

Xu, Fugui, et al. ""Rod-coil" copolymers get self-assembled in solution." Materials Chemistry Frontiers 3.11 (2019): 2283-2307.

Chen, Yu-Che, et al. "Improving the performance of photonic transistor memory devices using conjugated block copolymers as a floating gate." Journal of Materials Chemistry C 9.4 (2021): 1259-1268.

Liu, Cheng-Liang, et al. "Conjugated rod-coil block copolymers: Synthesis, morphology, photophysical properties, and stimuli-responsive applications." Progress in polymer science 36.5 (2011): 603-637.

Wang, Jingyi, and Ting Lei. "Separation of semiconducting carbon nanotubes using conjugated polymer wrapping." Polymers 12.7 (2020): 1548.

Lemasson, Fabien, et al. "Polymer library comprising fluorene and carbazole homo-and copolymers for selective single-walled carbon nanotubes extraction." Macromolecules 45.2 (2012): 713-722.

Zou, Jianhua, et al. "A general strategy to disperse and functionalize carbon nanotubes using conjugated block copolymers." Advanced Functional Materials 19.3 (2009): 479-483.

Zou, Jianhua, et al. "Dispersion of pristine carbon nanotubes using conjugated block copolymers." Advanced Materials 20.11 (2008): 2055-2060.

Wang, L. P., et al. "Spatial and temporal coherence of thermal radiation in asymmetric Fabry-Perot resonance cavities." International Journal of Heat and Mass Transfer 52.13-14 (2009): 3024-3031.

(Continued)

*Primary Examiner* — Stuart L Hendrickson

(74) *Attorney, Agent, or Firm* — Bell & Manning, LLC

(57) ABSTRACT

Methods of sorting carbon nanotubes and methods of forming films of aligned carbon nanotubes using rod-coil copolymers are provided. The rod-coil copolymers have a triblock or di-block architecture and include a conjugated polymer segment ("rod" segment) that binds the copolymer to the carbon nanotubes via pi-pi interactions and a non-conjugated polymer segment ("coil" segment) that aids with the sorting and dispersion of the carbon nanotubes in solution and/or controls the spacing of the carbon nanotubes in films made therefrom.

16 Claims, 5 Drawing Sheets

(56) References Cited

OTHER PUBLICATIONS

Lin, Chia-Hung, et al. "Poly [2, 7-(9, 9-dihexylfluorene)]-block-poly (2-vinylpyridine) Rod-Coil and Coil-Rod-Coil Block Copolymers: synthesis, morphology and photophysical properties in methanol/THF mixed solvents." Macromolecules 41.22 (2008): 8759-8769.

Kanimozhi, Catherine, et al. "Structurally Analogous Degradable Version of Fluorene-Bipyridine Copolymer with Exceptional Selectivity for Large-Diameter Semiconducting Carbon Nanotubes." ACS applied materials & interfaces 9.46 (2017): 40734-40742.

Hwang, Kyoungtae, et al. "Engineering the Structural Topology of Pyrene-Based Conjugated Polymers for the Selective Sorting of Semiconducting Single-Walled Carbon Nanotubes." Macromolecules 54.13 (2021): 6061-6072.

Wang, Huiliang, and Zhenan Bao. "Conjugated polymer sorting of semiconducting carbon nanotubes and their electronic applications." Nano Today 10.6 (2015): 737-758.

* cited by examiner

SELF-ASSEMBLING ROD-COIL COPOLYMERS FOR CARBON NANOTUBE SORTING AND THE FABRICATION OF CARBON NANOTUBE FILMS

REFERENCE TO GOVERNMENT RIGHTS

This invention was made with government support under 1727523 awarded by the National Science Foundation. The government has certain rights in the invention.

BACKGROUND

Carbon nanotubes, particularly single-walled carbon nanotubes, are key building blocks for nanoscale science and technology due to their interesting physical and chemical properties. Dispersing the carbon nanotubes in aqueous or non-aqueous media is a key step in processing carbon nanotubes for use in electronic devices. In addition, the sorting of high-purity, electronic grade, semiconducting, single-walled carbon nanotubes from a heterogeneous mixture is important for micro- and opto-electronic applications such as solar cells, field effect transistors (FETs) and logic circuits. Finally, for many applications, it is necessary to form assemblies of aligned carbon nanotubes with controlled spacing to make useful devices.

The challenge of sorting semiconducting single-walled carbon nanotubes has been overcome to some extent through the use of conjugated polymers that non-covalently and selectively bind to and disperse semiconducting carbon nanotubes, effectively eliminating their metallic counterparts. However, the conjugated polymers currently used are not able to effectively sort carbon nanotubes, as well as control the spacing of the carbon nanotubes in films of aligned carbon nanotubes.

SUMMARY

Methods of separating semiconducting single-walled carbon nanotubes from a starting carbon nanotube sample comprising a mixture of semiconducting single-walled carbon nanotubes and metallic single-walled carbon nanotubes using rod-coil type copolymers are provided. Also provided are methods of forming films of aligned carbon nanotubes using rod-coil copolymers.

One embodiment of a method of separating semiconducting single-walled carbon nanotubes from a starting carbon nanotube sample comprising a mixture of semiconducting single-walled carbon nanotubes and metallic single-walled carbon nanotubes includes the steps of: combining the carbon nanotube sample and a rod-coil copolymer in an organic solvent, wherein the rod-coil copolymer comprises a conjugated polymer segment that adheres to the surface of the carbon nanotubes via pi-pi interactions: and a non-conjugated polymer segment, whereby the rod-coil copolymer preferentially adheres to and disperses the semiconducting single-walled carbon nanotubes, relative to the metallic single-walled carbon nanotubes, in the organic solvent: and separating the dispersed single-walled carbon nanotubes from the undispersed single-walled carbon nanotubes to obtain a purified carbon nanotube dispersion having a higher ratio of semiconducting single-walled carbon nanotubes to metallic single-walled carbon nanotubes than the starting carbon nanotube sample.

One embodiment of a method of forming a carbon nanotube film includes the steps of: forming a non-aqueous dispersion of rod-coil copolymer-coated carbon nanotubes in an organic solvent, the rod-coil copolymer comprising a conjugated polymer segment that adheres to surfaces of the carbon nanotubes via pi-pi interactions and a non-conjugated polymer segment: flowing the non-aqueous dispersion across a surface of a substrate along a flow direction, wherein the rod-coil copolymer-coated carbon nanotubes are deposited on the surface with an alignment along the flow direction to form a coating of aligned rod-coil copolymer-coated carbon nanotubes: and drying the coating to form a film of aligned carbon nanotubes on the surface of the substrate

BRIEF DESCRIPTION OF THE DRAWINGS

Illustrative embodiments of the invention will hereafter be described with reference to the accompanying drawings, wherein like numerals denote like elements.

DETAILED DESCRIPTION

Figure 1:
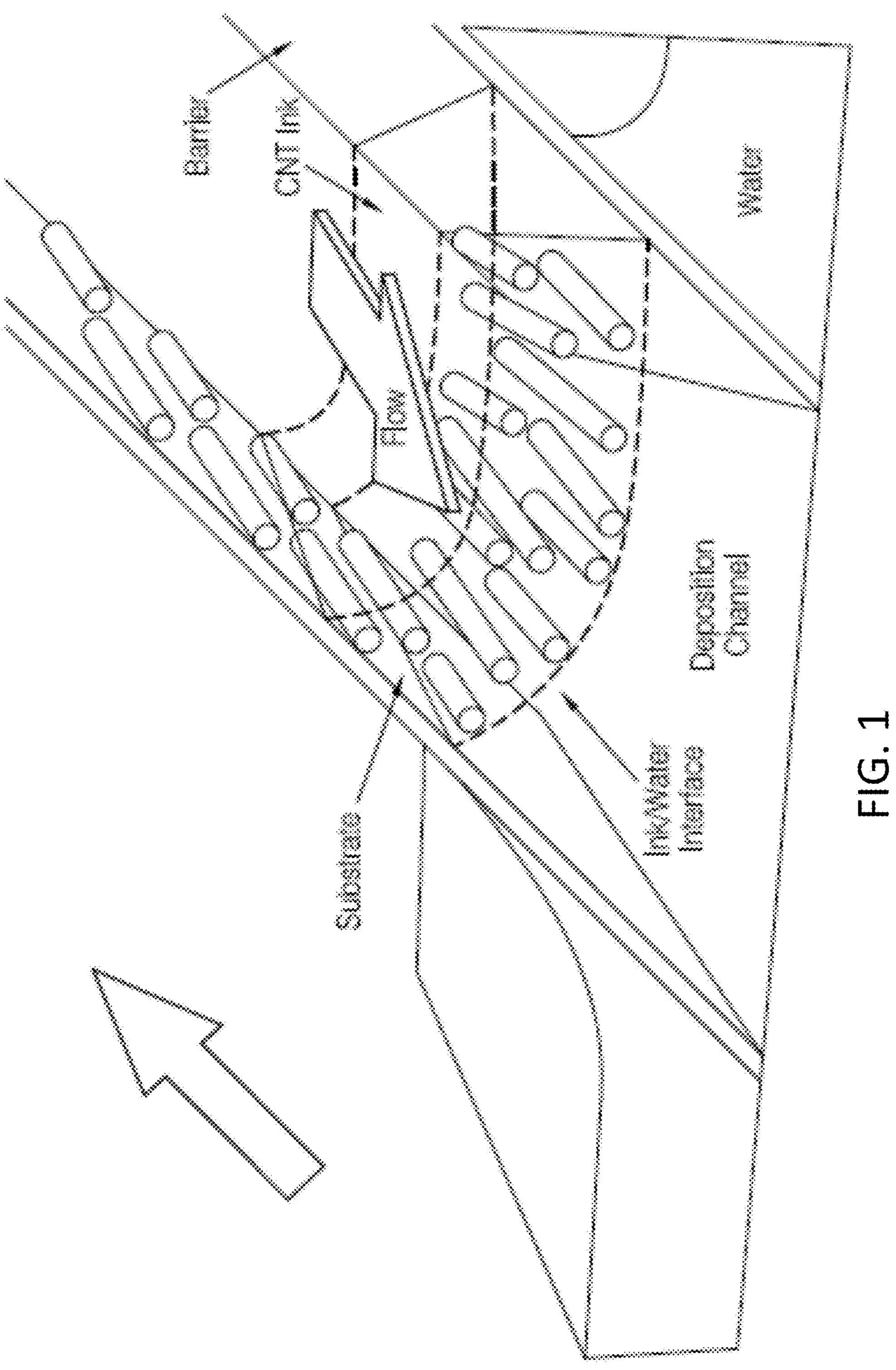
FIG. 1 shows one embodiment of a method for forming a film of aligned, rod-coil polymer-coated carbon nanotubes.

Methods of sorting carbon nanotubes and methods of forming films of aligned carbon nanotubes using rod-coil copolymers are provided. The copolymers have a tri-block or di-block architecture and include a conjugated polymer segment ("rod" segment) that binds the copolymer to the carbon nanotubes via pi-pi interactions and a non-conjugated polymer segment ("coil" segment) that aids with the dispersion of the carbon nanotubes in solution and/or controls the spacing of the carbon nanotubes in films made therefrom.

Carbon Nanotubes:

The carbon nanotubes used in the films may be single-walled carbon nanotubes (SWCNTs) and/or multiwalled carbon nanotubes (MWCNTs). The carbon nanotubes may be semiconducting, metallic, or a mixture of semiconducting and metallic carbon nanotubes. However, since many carbon nanotube-based applications and devices require or favor the use of semiconducting carbon nanotubes, semiconducting SWCNTs (s-SWCNTs) may be preferred. Thus, one aspect of the inventions described herein relates to methods for using the rod-coil copolymers to sort s-SWCNTs from metallic SWCNTs (m-SWCNTs) in a sample containing both.

SWCNTs are generally smaller than MWCNTs and are better semiconductors. The diameters of the of SWCNTs are typically in the range from about 0.5 nm to about 2 nm.

However, the diameters may depend upon the methods by which they are synthesized. s-SWCNTs made using arc discharge typically have diameters in the range from about 1.3 nm to about 1.7 nm, while s-SWCNTs made using Co—Mo catalysts (i.e., using CoMoCAT techniques) typically have diameters in the range from about 0.7 nm to about 1 nm. The SWCNTs may have a range of lengths, including lengths in the range from 100 nm to 3000 nm. However, SWCNTs having diameters and lengths outside of these ranges can be used.

MWCNTs are composed of multiple concentric cylindrical graphene tubes—that is, multiple concentric carbon nanotubes. They include at least two carbon nanotubes, but more typically six to 25, or even more. The MWCNTs typically have outer diameters of at least 3 nm and, more typically, 5 nm or greater, including diameters of up to 100 nm. By way of illustration, MWCNTs having diameters in the range from 5 nm to 50 nm can be used. The lengths of MWCNTs can vary over a wide range. For example, they can have lengths of 1 μm or longer, including 10 μm or longer (e.g., in the range from about 1 μm to 50 μm, including the range from 10 μm to 20 μm). However, MWCNTs with dimensions outside of the ranges recited here can be used.

Rod-Coil Copolymers:

The rod-coil copolymers have a di-block architecture represented by the structure A-B or tri-block architecture represented by the structure (A-B-A), wherein the "rod" segment ("B") is conjugated along the backbone of the polymer and is, therefore, a rigid segment, while the "coil" segment ("A") is non-conjugated along the backbone of the polymer and is, therefore, a more flexible segment. For the purposes of this disclosure, the coil segments are referred to as "non-conjugated" because they lack conjugation along the backbone of the polymer. However, the non-conjugated polymer segments may have conjugated (for example, aromatic) pendant groups attached to the backbone of the polymer.

Conjugated (Rod) Segments.

The conjugated segments contain one or more fused or unfused aromatic rings, desirably $C_6$ rings, which are able to bond to a carbon nanotube surface via non-covalent π-π bonding interactions. If the copolymers are being used to sort s-SWCNTs from a mixture of s-SWCNTs and m-SWCNTs, the conjugated segment of the copolymer should be selected such that it binds preferentially to s-SWCNTs over m-SWCNTs.

The backbone of the conjugated segment comprises conjugated units. The conjugated segment may be polymerized from a single type of monomer, such that the conjugated units that make up the conjugated segment are all of the same type. Alternatively, the conjugated segment may be polymerized from two or more types of monomers, such that two or more different conjugated units are present within a conjugated segment. Thus, the conjugated segments may be homopolymer segments or copolymer segments, provided that the conjugated segment is conjugated along the entire backbone of the segment.

Examples of conjugated units that may be found along the backbone of the conjugated segments include fluorene units, carbazole units, thiophene units, and derivatives thereof. (As used herein, the term "derivative" refers to a polymer unit that is derivatized with pendant side chains, such as, but not limited to, branched and unbranched alkyl groups, including $C_6$-$C_{20}$ alkyl groups, aminoalkyl groups, quaternary ammonium groups, ether groups, and nitro groups.) In some embodiments of the copolymers, the conjugated segments are composed entirely of one of these three types of conjugated units and/or derivatives thereof. In other embodiments of the copolymers, the conjugated segments are composed of a combination of two or more of these three types of conjugated units and/or derivatives thereof. In still other embodiments of the copolymers, the conjugated segments are composed of a combination of one or more of these three types of conjugated units and/or derivatives thereof and one or more different conjugated units.

Examples of derivatives of fluorene units that may be included in a conjugated segment include di- and mono-substituted fluorene units having the structure:

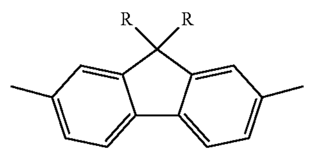

where each R is independently selected from hydrogen and $C_6$-$C_{18}$ alkyl chains. Examples of derivatives of carbazole units include N-(2-hexyl)decylcarbazole units and N-decylcarbazole. Examples of derivatives of thiophene units include substituted thiophene units having the structure:

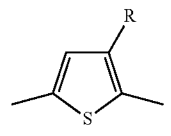

where R is selected from a $C_6$-$C_{12}$ alkyl chain.

Other conjugated units that may be present in the backbone of the conjugated segments with or without fluorene units, carbazole units, and/or polythiophene units include phenyl units, p-phenylenevinylene units, and derivatives thereof (e.g., m-phenylene-co-2,5-dioctoxy-p-phenylenevinylene units), dihydrophenanthrene and derivatives thereof (e.g., 9,10-dioctyl-9,10-dihydrophenanthrene-2,7-diyl units), benzothiadiazole units (e.g., 1,4-benzo-2,1,3-thiadiazole units) and derivatives thereof, pyridine units and derivatives thereof, bipyridine units and derivatives thereof, anthracene units and derivatives thereof, porphyrin units and derivatives thereof, 2,2'-dimethoxy-1,1'-binaphthalene units and derivatives thereof, pyrene units and derivatives thereof, and benzimidazole units and derivatives thereof.

Illustrative polymers that can make up the conjugated segment of the copolymers are described in: Wang, Jingyi, and Ting Lei "Separation of semiconducting carbon nanotubes using conjugated polymer wrapping." *Polymers* 12.7 (2020): 1548; Non-covalent polymer wrapping of carbon nanotubes and the role of wrapped polymers as functional dispersants: and Lemasson, Fabien, et al. "Polymer library comprising fluorene and carbazole homo- and copolymers for selective single-walled carbon nanotubes extraction." *Macromolecules* 45.2 (2012): 713-722, the disclosures of which are incorporated herein by reference for the purpose of providing descriptions of conjugated polymers for a conjugated segment. These polymers include the polyfluorene (PFO) derivatives mono- or di-substituted at the 9-position with R groups having the formula $—C_nH_{(2n+1)}$, where n=6, 8, 12, 15, or 18 and the R groups in di-substituted derivatives may be the same or different. Specific examples of such conjugated segments include poly(9,9-dioctyl-fluorenyl-2,7-diyl), poly(9,9-dihexyl-fluorenyl-2,7-diyl), and poly(9,9-di-n-dodecylfluorenyl-2,7-diyl) segments. The conjugated polymer segments may also be polycarbazole derivatives substituted at the 9-position with an R group having the formula $—CH_2—CH(C_nH_{(2n+1)})(C_nH_{(2n+1)})$, where n=6, 8, 12, 15, or 18 and the $(C_nH_{(2n+1)})$ groups may be the same or different. Poly(N-9'-hepta-decanyl-2,7-carbazole) is one such conjugated polymer. The conjugated polymers of the conjugated polymer segments also include polythiophene derivatives in which the thiophene ring is substituted with an R group having the formula $—C_mH_{(2m+1)}$, wherein m is 6, 8, or 12.

Illustrative examples of conjugated copolymers that can make up the conjugated segments of the rod-coil copolymers are described in Fujigaya et al., "Non-covalent polymer wrapping of carbon nanotubes and the role of wrapped polymers as functional dispersants." *Science and technology of advanced materials* 16.2 (2015): 024802. Kanimozhi et al "Structurally Analogous Degradable Version of Fluorene-Bipyridine Copolymer with Exceptional Selectivity for Large-Diameter Semiconducting Carbon Nanotubes." *ACS applied materials & interfaces* 9.46 (2017): 40734-40742: Hwang et al. "Engineering the Structural Topology of Pyrene-Based Conjugated Polymers for the Selective Sorting of Semiconducting Single-Walled Carbon Nanotubes." *Macromolecules* 54.13 (2021): 6061-6072; and Wang et al., "Conjugated polymer sorting of semiconducting carbon nanotubes and their electronic applications." *Nano Today* 10.6 (2015): 737-758. These examples include the conjugated polymers designated PFO-BPy, PFO-N-BPy, PFO-PFO(blanch), PFO-carbazole, PFO-porphyrin, PFO-Binap (R), PFO-Binap(S), PPhO, monoalkyl-PFO, CP-M, P(1,6-pyDPP), PFO-BT, and pDTFF-mT in those references.

The rod-coil copolymers described herein include embodiments in which the conjugated polymer segment includes any of the specific conjugated units and/or conjugated polymers described above, and also includes embodiments in which the conjugated polymer segment excludes any of the specific conjugated units and/or conjugated polymers described above.

The conjugated polymer segments are desirably long enough to wrap around a carbon nanotube at least once, but may be long enough to wrap around the carbon nanotube multiple times. The length of the conjugated segment can be tailored to achieve a desired degree of carbon nanotube dispersion and sorting, which will vary depending upon the particular monomers used to form the segment. However, because the carbon nanotube dispersing and sorting capabilities of the conjugated rod segments of the copolymers are enhanced by the coil segments, the conjugated segments in the copolymers can be substantially shorter than the corresponding homopolymers that have been used in carbon nanotube dispersion and sorting applications.

Non-Conjugated (Coil) Segments.

The backbone of the non-conjugated segments is non-conjugated. The non-conjugated segments may be polymerized from a single type of monomer, such that the non-conjugated units that make up the non-conjugated segments are all of the same type. Alternatively, the non-conjugated segments may be polymerized from two or more types of monomers, such that two or more different non-conjugated units are present within a non-conjugated segment. Thus, the non-conjugated segments may be homopolymer segments or copolymer segments.

The monomers used to make the non-conjugated segments may be selected to enhance the solubility of the copolymers in an organic solvent. Furthermore, the length of the non-conjugated segment may be selected to provide a desired spacing between the aligned carbon nanotubes in a carbon nanotube film formed therefrom. The length of a polymer segment is reflected by the number of repeating units in the polymer segment. Typically, the non-conjugated polymer segment will be longer than the conjugated polymer segment, having, for example, an average number of units that is at least two-times, at least three-times, at least four-times, or at least five-times the average number of units in the conjugated polymer segment.

The addition of the non-conjugated segments does not erode the sorting efficiency of the rod-coil copolymers. In fact, the sorting efficiency of the rod-coil copolymers is the same as, or better than, the sorting efficiency of the rod segments alone.

The non-conjugated segments can be polymerized from a variety of monomers that are able to undergo free-radical polymerization, anionic polymerization, or condensation polymerization. Examples of monomers that may be used to form the backbone of the conjugated segments include styrene monomers, styrene monomers bearing substituents (referred to herein as styrenic monomers), methacrylate monomers and/or acrylate monomers (collectively referred to as (meth)acrylate monomers), diene monomers (e.g., butadiene), alkylene oxide monomers, vinyl ether monomers, ester monomer, carbonate monomers, amide monomers, urethane monomers, vinyl pyridine monomers, acrylamide monomers, epoxy monomers, and mixtures of two or more thereof. By way of illustration, suitable non-conjugated polymer segments include polystyrene segments, poly(2-vinylpyridine) segments, poly(4-vinylpyridine) segments, poly(ethylene oxide) segments, polymethacrylate segments, polymethylmethacrylate segments, poly(t-butylacrylate) segments, polyisoprene segments, poly(2-(dimethylamino)-ethyl methacrylate) segments, and poly(N-isopropyl-acrylamide) segments.

The rod-coil copolymers described herein include embodiments in which the non-conjugated polymer segment includes any of the specific non-conjugated monomers and polymers described above, and also includes embodiments in which the non-conjugated polymer segment excludes any of the specific non-conjugated monomers and polymers described above.

Any of the non-conjugated polymer segments described here can be used with any of the above-described conjugated polymer segments to form a coil-rod type copolymer, and any of the coil-rod copolymers can be used with any of the above-described types of carbon nanotubes.

Copolymer Synthesis:

The synthesis of the rod-coil polymers can be carried out by separately synthesizing the rod segments and the coil segments, each with reactive chain end functionalities, and then coupling the rod segments with the coil segments via reaction of the chain ends using, for example, a condensation reaction, such as click condensation. Alternatively, the rod segment or the coil segment can be synthesized first and used as a macroinitiator for the polymerization of the other segment. Suitable techniques for polymerizing the conjugated segments include free-radical polymerization, anionic polymerization, and catalyzed coupling. Such techniques include anionic living polymerization, atomic transfer radical polymerization (ATRP), reversible addition fragmentation chain transfer polymerization (RAFT), ring-opening metathesis polymerization (ROMP), nitroxide-mediated radical polymerization (NMP), and Suzuki, Yamamoto, and Stille coupling reactions. The non-conjugated segments can also be made via known anionic, condensation, and free-radical polymerization processes, including ATRP.

More detailed descriptions of polymerization techniques that may be used for the synthesis of the rod-coil copolymer can be found in Ribeiro, Anielen H., et al. "Direct synthesis of light-emitting triblock copolymers from RAFT polymerization." *Polymer Chemistry* 12.2 (2021): 216-225: Xu. Fugui, et al. ""Rod-coil" copolymers get self-assembled in solution." *Materials Chemistry Frontiers* 3.11 (2019): 2283-2307; and Liu, Cheng-Liang, et al. "Conjugated rod-coil block copolymers: Synthesis, morphology, photophysical properties, and stimuli-responsive applications." *Progress in polymer science* 36.5 (2011): 603-637.

Carbon Nanotube Sorting:

s-SWCNTs have exceptional electronic properties that enable a plethora of semiconducting applications such as field-effect transistors (FETs), photovoltaics (PVs), and gas sensors. In order to implement SWCNTs as the semiconducting material in electronic devices, it is sometimes necessary to purify and sort out the desirable semiconducting s-SWCNTs from as-synthesized electronically heterogeneous SWCNT mixtures.

In the sorting methods, a dispersion of mixed m-SWCNTs and s-SWCNTs and one or more rod-coil copolymers is formed in an organic solvent. The dispersions may be formed by mixing the rod-coil copolymers with the carbon nanotubes in an organic solvent, with optional stirring or agitation. The organic solvent can be a single solvent or a solvent mixture in which the rod-coil copolymer is substantially soluble. Examples of suitable organic solvents include toluene, xylene, chloroform, dichloromethane, dichlorobenzene, and mixtures of any two or more thereof. In the dispersion, the conjugated polymer segment preferentially binds to and wraps the s-SWCNTs over the m-SWCNTs. As a result, the s-SWCNTs are selectively dispersed in the solution, while the m-SWCNTs selectively fall out of the solution. The undispersed m-SWCNTs can then be removed from the solution using, for example, centrifugation followed by filtration, leaving a purified solution that is enriched in s-SWCNTs. The methods can be used to sort and separate s-SWCNTs having a range of diameters and bandgaps, including bandgaps in the range from 0.1 eV to 1.0 eV.

The sorting procedures result in a highly pure sample of s-SWCNTs having a ratio of s-SWCNTs to m-SWCNTs that is substantially higher than that of the starting mixed SWCNTs sample. In some embodiments, the methods of sorting and separating s-SWCNTs provide a purified sample that contains at least 95% s-SWCNTs, based on the total number of s-SWCNTs and m-SWCNTs in the sample. This includes methods that provide a purified sample that contains at least 98% s-SWCNTs, based on the total number of s-SWCNTs and m-SWCNTs in the sample, and further includes methods that provide a purified sample that contains at least 99.5% s-SWCNTs, based on the total number of s-SWCNTs and m-SWCNTs in the sample. Methods for quantifying s-SWCNT purity can be found in Ding, J. F., et al. (2015). "A hybrid enrichment process combining conjugated polymer extraction and silica gel adsorption for high purity semiconducting single-walled carbon nanotubes (SWCNT)." *Nanoscale* 7(38): 15741-15747.

Carbon Nanotube Film Formation:

Films of aligned carbon nanotubes can be formed on a substrate surface from dispersions of the polymer-coated carbon nanotubes in an organic solvent. The dispersions may be formed as discussed above. In the dispersion, the backbone of the conjugated polymer segment binds to and wraps the carbon nanotubes, while the backbone of the non-conjugated polymer segment does not bind to the carbon nanotube. As discussed above, if the starting carbon nanotube sample contains a mixture of s-SWCNTs and m-SWCNTS and the sorting of the s-SWCNTs is desired, the copolymer may preferentially bind to s-SWCNTs over m-SWCNTs. However, for applications in which a pure s-SWCNT sample is not needed, the rod-coil copolymer need not have s-SWCNT sorting capabilities.

The polymer-coated carbon nanotubes in the dispersion and the films made therefrom each have a partial or complete coating of one or more rod-coil copolymers wrapped around their surface. As such, films comprising the carbon nanotubes are distinguishable from films in which carbon nanotubes are dispersed in a continuous, bulk polymer matrix.

Films of aligned carbon nanotubes can be formed by flowing a dispersion of the rod-coil polymer-coated carbon nanotubes across the surface of a substrate, whereby the polymer-coated carbon nanotubes are aligned along the direction of flow by shear forces and the aligned carbon nanotubes deposit onto the surface of the substrate as the dispersion flows across the substrate surface. The shear forces can be created by flowing the dispersion through a channel to form a velocity gradient across the flowing dispersion, whereby the polymer-coated carbon nanotubes adhere to and deposit on one or more surfaces of the channel (e.g., the walls and/or floor) as the dispersion flows through the channel. Shear flow-based methods for forming films of aligned carbon nanotubes on surfaces are described in U.S. Pat. No. 10,873,026, US patent application publication number 2022/0255001, Jinkins. Katherine R., et al "Aligned 2D carbon nanotube liquid crystals for wafer-scale electronics." *Science advances* 7.37 (2021): eabh0640, and Jinkins. Katherine R., et al. "Substrate-Wide Confined Shear Alignment of Carbon Nanotubes for Thin Film Transistors." *Advanced Electronic Materials* 5.2 (2019). 1800593.

In some embodiments of the methods, the dispersion flows across a second liquid within a channel, wherein the second liquid is sufficiently immiscible with the dispersion to form an interface between the dispersion and the second liquid. As the dispersion flows across the surface of the second liquid, the rod-coil polymer-coated carbon nanotubes become concentrated at the interface, where they are aligned along the flow direction. The aligned carbon nanotubes at the interface adhere to and deposit on one or more surfaces (e.g., walls) of the channel with which they are in contact. Translating the substrate surface across the interface may be achieved by moving the substrate in a direction perpendicular to the interface as the dispersion is flowing through the channel, or by changing the position of the interface relative to the substrate as the dispersion is flowing through the channel.

Substrates to which the rod-coil polymer-coated carbon nanotubes may adhere include: bare silica ($SiO_2$); yttrium oxide, 3-aminopropyltriethoxysilane (APTES); hexamethyldisilazane (HMDS); trichloro-(1H,1H,2H,2H perfluorooctyl)silane (PFOTS); dimethylmethoxy(3,3,3-trifluoropropyl)silane; alkyl silanes with n carbons, where n is 2, 3, 4, 5, 6, 8, 10, 12, 14, 16, 20, or 22; C2 to C20 alkyl silanes with $—OH$, $—SH$, $—C{=}CH_2$, $—CC_3$, $—CF_3$, $—COOH$, and $—CONH_2$ end-groups, specifically, $C_5—CC_3$, $C_6—OH$, $C_5—CONH_2$, $C_6{=}C$, $C_5—COOH$, $C_6—SH$, and $C_5—CF_3$; polyethylene oxide silanes (PEO-Si); polyethylene glycol silane (PEG-Si); methyltrichlorosilane; ethyltrichlorosilane; trichloro(propyl)silane; butyltrichlorosilanel pentyltrichlorosilane, n-hexyltriethoxysilane, trichlorohexylsilane; trichloro(octyl)silane, and dodecyltrichlorosilane. The substrate may be selected to facilitate adhesion to the coil block of a rod-coil polymer via hydrophobic-hydrophobic or hydrophilic-hydrophilic interactions.

FIG. 1 illustrates a method of forming a film of aligned carbon nanotubes in which a flow channel is formed between two tilted walls ("barriers"). The "floor" of the channel is provided by a layer of water, with which a dispersion of rod-coil polymer coated carbon nanotubes (CNT Ink), is immiscible. As the CNT Ink flows over the water, the carbon nanotubes become concentrated at the interface between the water and the dispersion, where they are aligned along the flow direction. As the left barrier is translated across the interface, a film of aligned carbon nanotubes is formed on the surface of the barrier.

For the carbon nanotubes in a film to be considered "aligned", it is not required that all of the deposited carbon nanotubes be perfectly aligned: only that the average degree of alignment of the carbon nanotubes in the film is measurably greater than that of an array of randomly oriented carbon nanotubes. The degree of alignment of the carbon nanotubes in the films refers to their degree of alignment along their longitudinal axes within the films, which can be quantified using two-dimensional fast Fourier transform (2D-FFT), as described in the Example. The methods described herein are able to produce films in which the carbon nanotubes have a degree of alignment of 18° or better. This includes films in which the carbon nanotubes have a degree of alignment of 15° or better, and further includes films in which the carbon nanotubes have a degree of alignment of 10° or better. By way of illustration only, some embodiments of the films have a carbon nanotube degree of alignment in the range from 5° to 10° (e.g., 6° to 9°).

The alignment of the carbon nanotubes can be characterized by performing a two-dimensional Fast Fourier Transform (2D FFT) analysis of scanning electron microscopy (SEM) images. Using this method, an SEM image of the s-SWCNTs deposited on a surface is prepared for analysis. The 2D FFT is calculated using the fft2 function in Matlab™. The FFT is shifted to the center of the image using the ffishift function in Matlab™ for a more convenient representation. The FFT shows a pattern of bright lobes oriented perpendicular to the main direction of orientation of the s-SWCNTs. The orientation distribution is obtained by integrating the intensity of the shifted FFT from a distance f min to a distance f max from the center of the image, at angles varying from −90° and 90°. In practice, the image is rotated using the function imrotate in Matlab™ at each angle of interest using a nearest-neighbor interpolation scheme. The intensity is averaged over the horizontal axis from f min to f max. Finally, the orientation distribution is fitted with a Gaussian distribution to obtain the standard deviation ($\sigma$). The standard deviation is used as the s-SWCNT alignment degree. (Adapted from Dwyer, J. H.: Suresh, A.: Jinkins K. R.: Zheng, X.: Gopalan, P and Arnold, M. S. Chemical and topographical patterns combined with solution shear for selective-area deposition of highly-aligned semiconducting carbon nanotubes. Nanoscale Adv., 2021, 3, 1767.)

The films of aligned carbon nanotubes can be deposited over large surface areas, including surface areas with dimensions 1 mm×1 mm or larger, surface areas with dimensions of 1 cm×1 cm or larger, and surface areas with dimensions of 10 cm×10 cm or larger. While films having more than a single monolayer of carbon nanotubes can be deposited, monolayer and sub-monolayer films can also be formed.

Because the non-conjugated coil segments of the rod-coil copolymers extend away from the carbon nanotubes, these segments can be used to control the spacing ("pitch") between neighboring aligned carbon nanotubes. When the films have a high concentration of polymer-coated carbon nanotubes, the spacing between each carbon nanotube and its nearest neighbors corresponds to the length of the non-conjugated polymer segments of the copolymer. Thus, if the coil segments of the rod-coil copolymer are intended to control the spacing between the carbon nanotubes in the deposited films, the concentration of the polymer-coated carbon nanotubes in the dispersion should be sufficiently high that the non-conjugated segments of the copolymers dictate the closest spacing between the carbon nanotubes in the films. By way of illustration, in order to form films of aligned carbon nanotubes with their spacing dictated by the non-conjugated polymer segments, dispersions having carbon nanotube concentrations of at least 100 μg $mL^{-1}$ may be used. This includes dispersions having a carbon nanotube concentration of at least 200 μg $mL^{-1}$.

Figure 2:
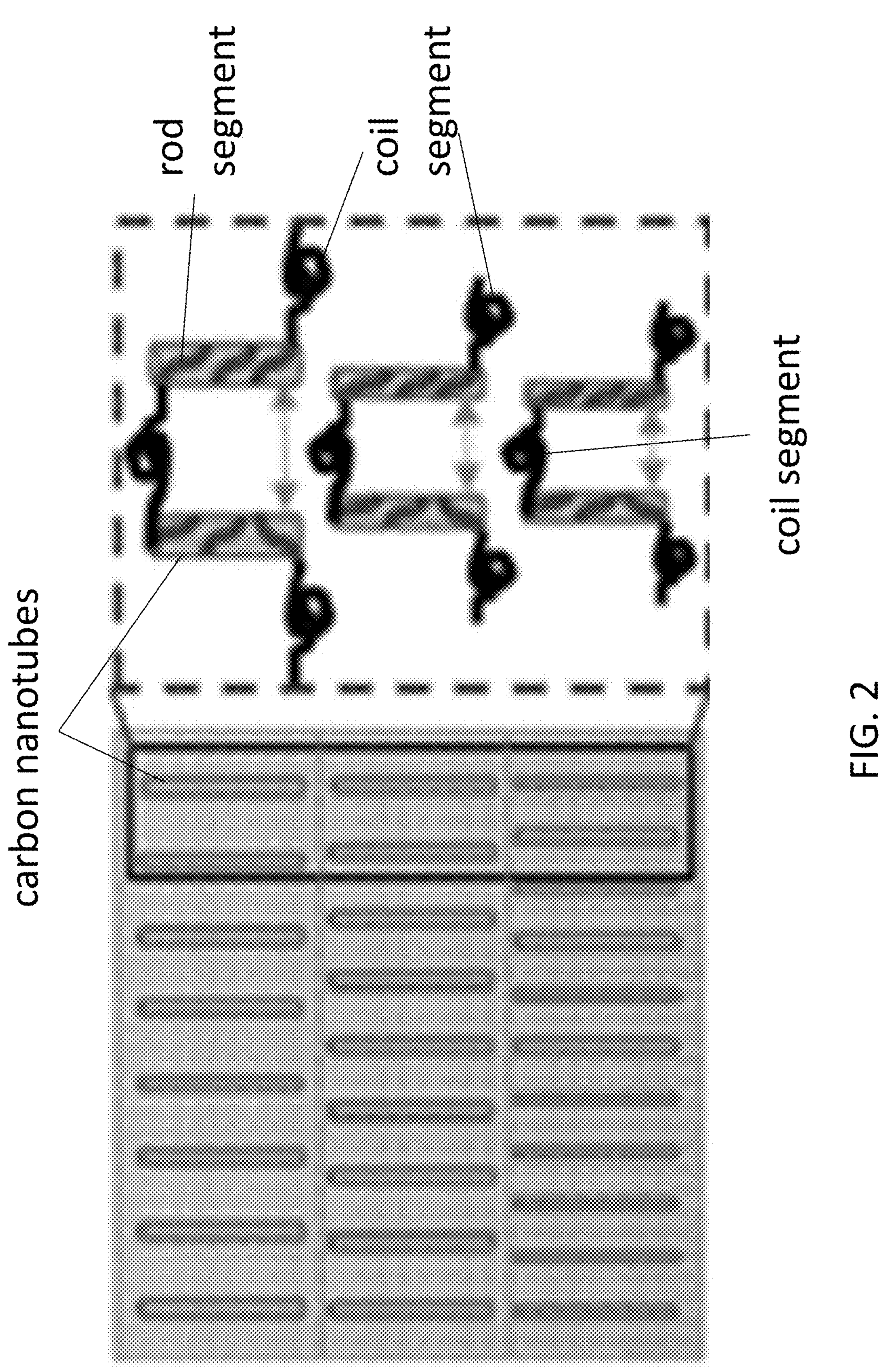
FIG. 2 is a schematic illustration showing s-SWCNTs aligned using shear-based methods and conjugated coil-rod block copolymer wrappers to tune the spacing between the nanotubes.

The role played by the rod-coil copolymer in carbon nanotube pitch control is illustrated schematically in FIG. 2. The film depicted in the figure has three rows of aligned carbon nanotubes. The rod-coil copolymer wrapping the carbon nanotubes in the top row has the longest coil segment length (molecular weight) and the rod-coil copolymer wrapping the carbon nanotubes in the bottom row has the shortest coil segment length (molecular weight). As shown in FIG. 2, a longer coil segment length corresponds to a larger spacing between the carbon nanotubes.

The concentration of carbon nanotubes in the films can be measured by their linear packing density in the films. Linear packing density refers to the number of carbon nanotubes per μm along a line perpendicular to the dominant axis of carbon nanotube alignment. Linear packing density can be measured using scanning electron microscopy (SEM) image analysis. The maximum achievable linear packing density will be determined by the length of the non-conjugated polymer segments. The methods described herein are able to produce films in which the carbon nanotubes have a linear packing density of at least 100 carbon nanotubes/μm. This includes films in which the carbon nanotubes have a linear packing density of at least 250 carbon nanotubes/μm and at least 500 carbon nanotubes/μm. By way of illustration only, some embodiments of the films have a carbon nanotube linear packing density in the range from 100 carbon nanotubes/μm to 1000 carbon nanotubes/μm. Films having such high carbon nanotube linear packing densities enable the formation of aligned carbon nanotubes with a pitch of 5 nm or less.

Once the films are deposited, the organic solvents can be removed and, optionally, the polymer coatings can be removed from the carbon nanotubes.

Example

This example illustrates the carbon nanotube sorting and aligned film-forming capabilities of rod-coil type copolymers, using an ABA polystyrene-polyfluorene-polystyrene block copolymer as an illustrative example. It should be understood that the same method can be used for carbon nanotube sorting and aligned film-formation with the other rod-coil copolymers described herein.

s-SWCNTs were isolated from arc-discharge carbon nanotube soot by using different mass ratio of the raw soot to the ABA PS-PFO-PS polymer wrapper. The PS-PFO-PS triblock polymer was first dispersed in toluene at various concentrations from 0.1 to 5 mg/ml. The polymer dispersion was combined with the nanotube soot at the same nanotube concentration of 1 mg/ml. The mixture was then sonicated at 40% amplitude for 10 mins using a horn-tip ultra-sonicator (Sonic Dismembrator 500, Thermo Fisher Scientific). This solution is centrifuged (Sorvall MX 120+, Thermo Fisher Scientific) at $2.5\times10^5$ g for 10 min to remove undispersed nanotubes and other amorphous carbon allotropes. The top 90% of the supernatant of each centrifuge tube is collected and the concentration is measured optically. The nanotube concentration in solution is determined using known optical cross sections from the S22 transition.

Figure 3B:
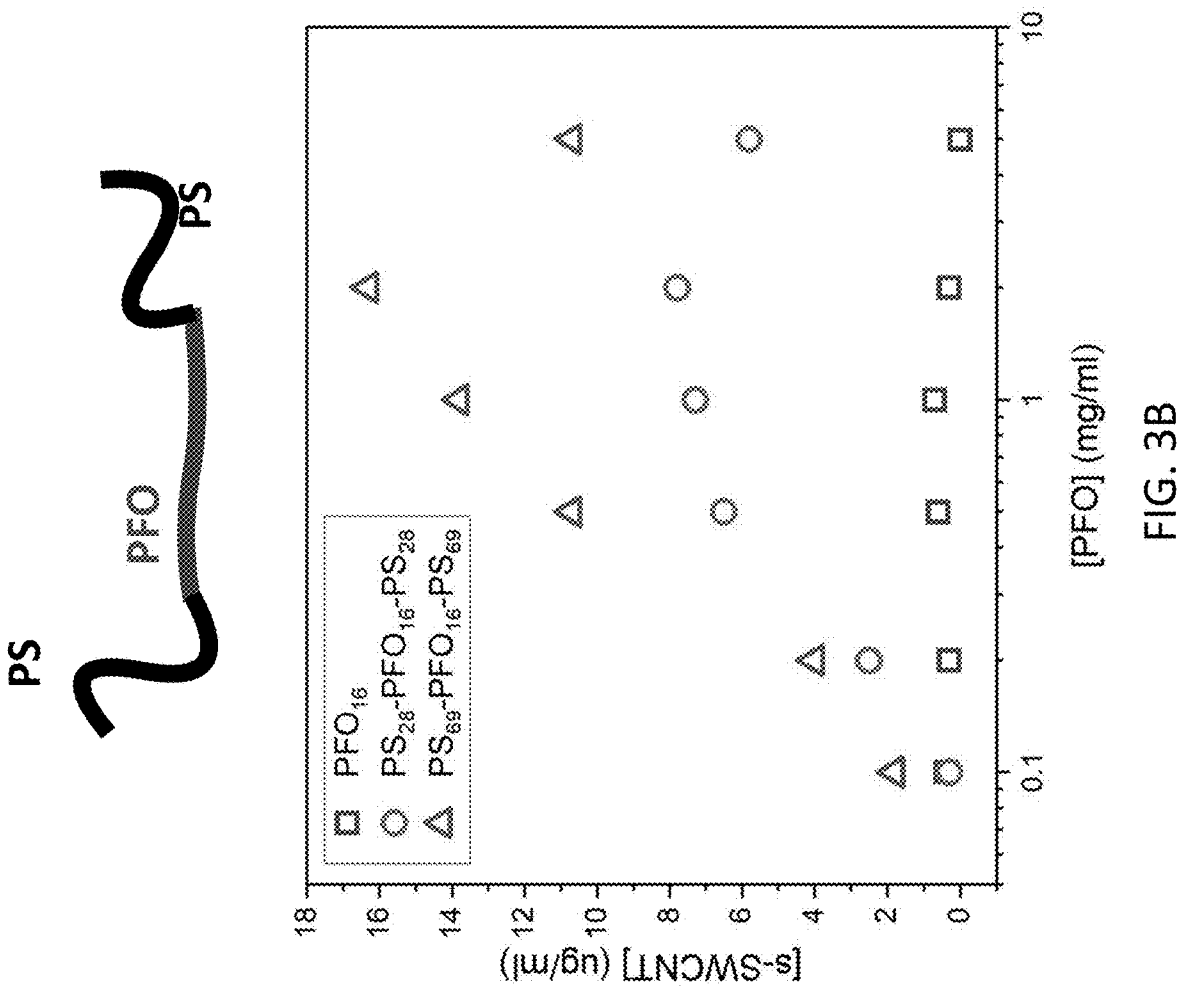
FIG. 3B shows the yields of s-SWCNTs increasing with greater PFO concentrations and increasing coil lengths.
Figure 3A:
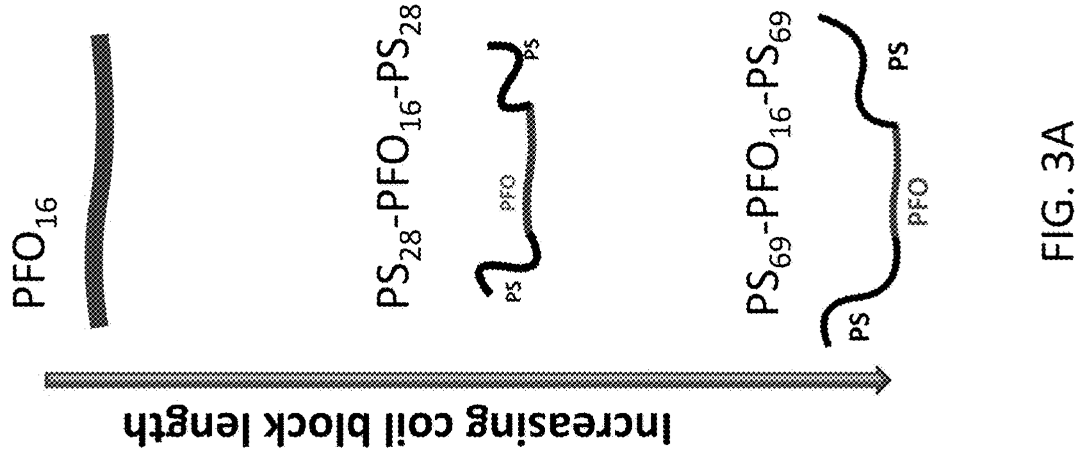
FIG. 3A is an example schematic showing a $PFO_{16}$ homopolymer and two ABA PS-PFO-PS polymers with different coil lengths.
Figure 4B:
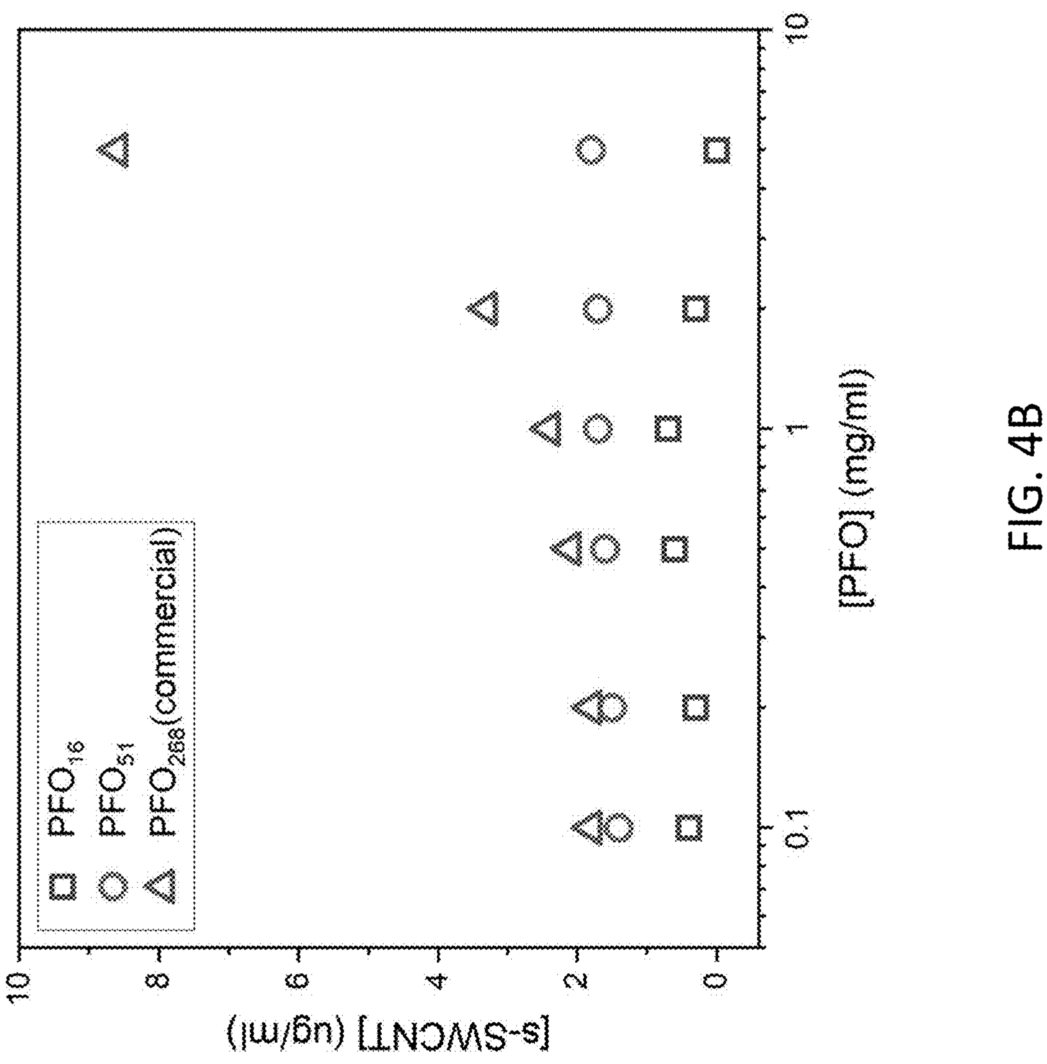
FIG. 4B shows the yields of polymer-wrapped s-SWCNTs as a function PFO concentration and PFO length. The yields remain essentially unchanged with $PFO_{16}$ and $PFO_{51}$, whereas with $PFO_{268}$ the yield increases exponentially.
Figure 4A:
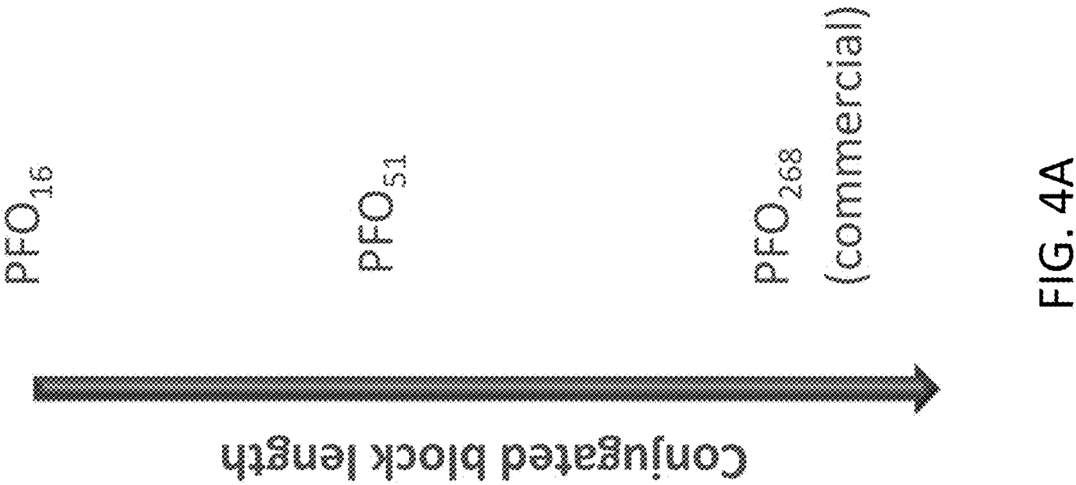
FIG. 4A is a schematic listing conjugated PFO blocks with increasing lengths.

Schematics of a $PFO_{16}$ homopolymer and two ABA PS-PFO-PS polymers with different coil lengths and the yields of s-SWCNTs increasing with greater PFO concentrations and increasing coil lengths are shown in FIGS. 3A and 3B. A list of conjugated PFO blocks with increasing lengths and yields of polymer-wrapped s-SWCNTs as a function PFO concentration and PFO length are shown in FIGS. 4A and 4B.

Figure 5:
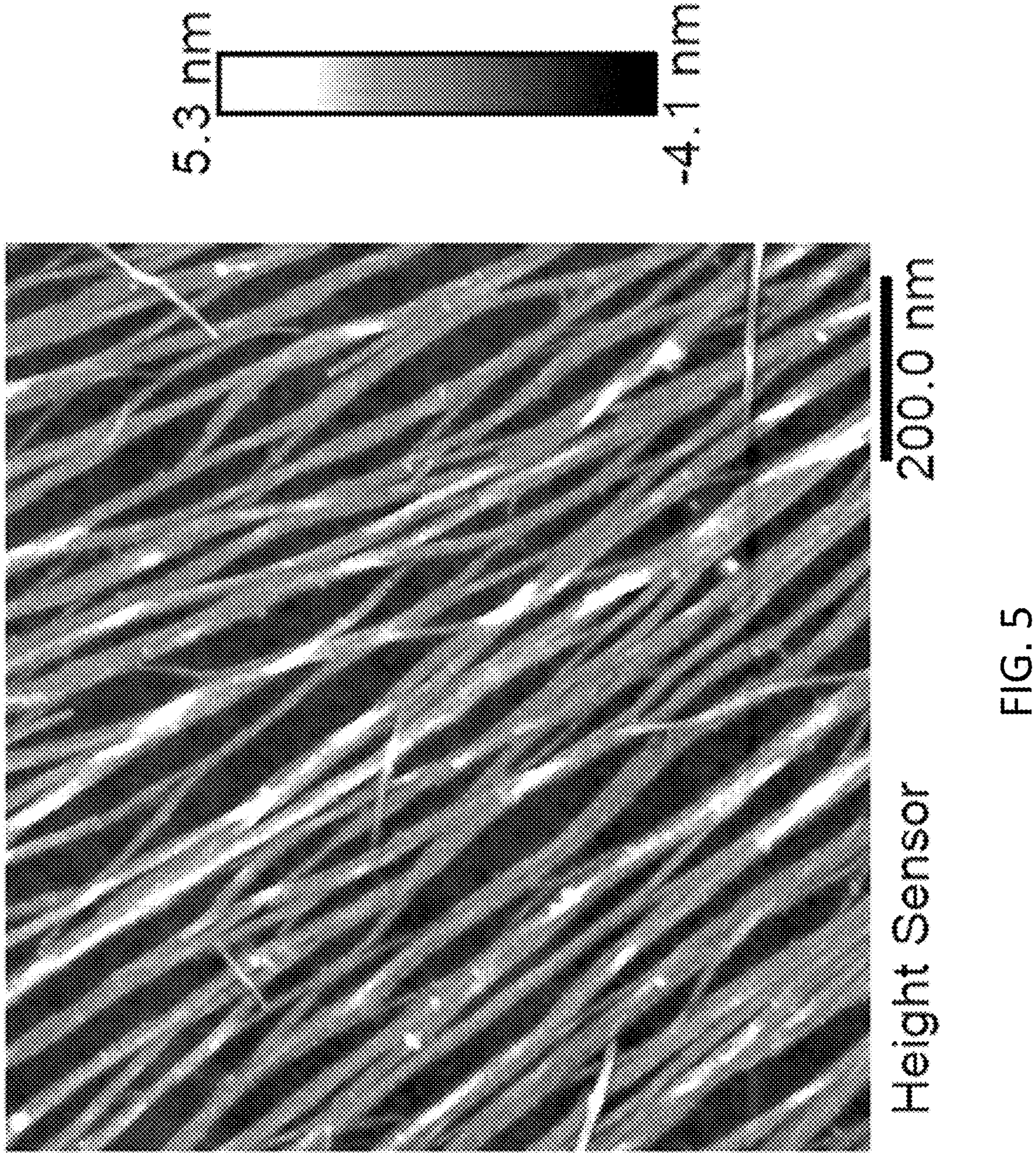
FIG. 5 is an atomic force microscope (AFM) height image of a film of aligned arc discharge single-walled carbon nanotubes coated with a $PS_{28}$-$PFO_{16}$-$PS_{28}$ rod-coil polymer and deposited by TaFISA, as described in the Example.

Films of aligned carbon nanotubes were deposited via a method known as 2D nematic tangential flow inter-facial self-assembly (TaFISA) using the setup shown in FIG. 1. (Jinkins, K. R. et al. Aligned 2D carbon nanotube liquid crystals for wafer-scale electronics. *Sci. Adv.* 7, eabh0640 (2022).) The setup of TaFISA was composed of two 45° tilted coplanar substrates (barriers), opening a channel with a width of roughly 3 mm. The substrates were attached to a substrate lift motor and suspended in a trough filled with deionized water. The triblock rod-coil copolymer wrapped carbon nanotubes suspended in chloroform (CNT ink) was injected into the channel using a needle which was angled at 15° from the horizontal and centered between two substrates. Carbon nanotubes from the injected ink collected at the organic dispersion/water interface, self-aligned, and formed a 2D nematic liquid crystal. The self-aligned nanotubes were then deposited onto a substrate that was translated across the interface. The resulting film of aligned, rod-coil copolymer-coated carbon nanotubes is shown in FIG. 5.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean only one or can mean "one or more." Embodiments of the inventions consistent with either construction are covered.

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of separating semiconducting single-walled carbon nanotubes from a starting carbon nanotube sample comprising a mixture of semiconducting single-walled carbon nanotubes and metallic single-walled carbon nanotubes, the method comprising:

combining the carbon nanotube sample and a rod-coil copolymer in an organic solvent, wherein the rod-coil copolymer comprises a conjugated polymer segment that adheres to the surface of the carbon nanotubes via pi-pi interactions; and a non-conjugated polymer segment, whereby the rod-coil copolymer preferentially adheres to and disperses the semiconducting single-walled carbon nanotubes, relative to the metallic single-walled carbon nanotubes, in the organic solvent; and separating the dispersed single-walled carbon nanotubes from the undispersed single-walled carbon nanotubes to obtain a purified carbon nanotube dispersion having a higher ratio of semiconducting single-walled carbon nanotubes to metallic single-walled carbon nanotubes than the starting carbon nanotube sample.

2. The method of claim 1, further comprising forming a film of aligned carbon nanotubes from the purified carbon nanotube dispersion.

3. The method of claim 2, wherein the non-conjugated segment comprises a polystyrene, a poly(meth)acrylate, a polydiene, a polyalkylene oxide, a polyvinyl ether, a polycarbonate, a polyamide, a polyurethane, a polyvinyl pyridine, a polyacrylamide, or a polyepoxide.

4. The method of claim 3, wherein the non-conjugated polymer segment comprises the polystyrene.

5. The method of claim 1, wherein the conjugated polymer segment comprises fluorene units, carbazole units, thiophene units, or a combination of two or more thereof.

6. The method of claim 5, wherein the fluorene units, carbazole units, thiophene units, or a combination of two or more thereof comprise fluorene derivatives, carbazole derivates, thiophene derivatives, or a combination of two or more thereof.

7. The method of claim 6, wherein the conjugated polymer segment comprises the fluorene derivatives.

8. The method of claim 1, wherein the rod-coil copolymer comprises a polyfluorene segment and a polystyrene segment.

9. A method of forming a carbon nanotube film, the method comprising:

forming a non-aqueous dispersion of rod-coil copolymer-coated carbon nanotubes in an organic solvent, the rod-coil copolymer comprising a conjugated polymer segment that adheres to surfaces of the carbon nanotubes via pi-pi interactions and a non-conjugated polymer segment;

flowing the non-aqueous dispersion across a surface of a substrate along a flow direction, wherein the rod-coil copolymer-coated carbon nanotubes are deposited on the surface with an alignment along the flow direction to form a coating of aligned rod-coil copolymer-coated carbon nanotubes; and drying the coating to form a film of aligned carbon nanotubes on the surface of the substrate.

10. The method of claim 9, wherein the conjugated polymer segment comprises fluorene units, carbazole units, thiophene units, or a combination of two or more thereof.

11. The method of claim 10, wherein the fluorene units, carbazole units, thiophene units, or a combination of two or more thereof comprise fluorene derivatives, carbazole derivates, thiophene derivatives, or a combination of two or more thereof.

12. The method of claim 11, wherein the conjugated polymer segment comprises the fluorene derivatives.

13. The method of claim 10, wherein the non-conjugated segment comprises a polystyrene, a poly(meth)acrylate, a polydiene, a polyalkylene oxide, a polyvinyl ether, a polycarbonate, a polyamide, a polyurethane, a polyvinyl pyridine, a polyacrylamide, or a polyepoxide.

14. The method of claim 13, wherein the non-conjugated polymer segment comprises the polystyrene.

15. The method of claim 9, wherein the rod-coil copolymer comprises a polyfluorene segment and a polystyrene segment.

16. The method of claim 9, wherein a closest spacing between the carbon nanotubes in the film is at least as long as the length of the non-conjugated segment of the rod-coil copolymer.

* * * * *